US012340237B2

(12) United States Patent
Cramer et al.

(10) Patent No.: US 12,340,237 B2
(45) Date of Patent: Jun. 24, 2025

(54) PROCESS EXECUTION GUIDE BASED ON PROCESS MODEL

(71) Applicant: SAP SE, Walldorf (DE)

(72) Inventors: Alexander Cramer, Walldorf (DE); Andre Wenz, Berlin (DE); Paul-Alexander Herr, Walldorf (DE); Gregor Berg, Berlin (DE)

(73) Assignee: SAP SE, Walldorf (DE)

( * ) Notice: Subject to any disclaimer, the term of this patent is extended or adjusted under 35 U.S.C. 154(b) by 122 days.

(21) Appl. No.: 18/341,007

(22) Filed: Jun. 26, 2023

(65) Prior Publication Data

US 2024/0427614 A1     Dec. 26, 2024

(51) Int. Cl.
*G06F 9/00* (2018.01)
*G06F 9/451* (2018.01)
*G06F 9/50* (2006.01)

(52) U.S. Cl.
CPC ............ *G06F 9/451* (2018.02); *G06F 9/5027* (2013.01)

(58) Field of Classification Search
CPC .......... G06F 9/451; G06F 9/5027; G06F 8/38; G06F 3/0482; G06F 3/04847; G06Q 10/103
See application file for complete search history.

(56) References Cited

U.S. PATENT DOCUMENTS

| | | | |
|---|---|---|---|
| 7,921,408 B2* | 4/2011 | Shenfield | G06F 8/20 717/109 |
| 9,965,151 B2* | 5/2018 | Zaveri | G06F 3/017 |
| 11,954,622 B2* | 4/2024 | Berg | G06Q 30/04 |
| 2002/0101448 A1 | 8/2002 | Sanderson | |
| 2006/0005140 A1* | 1/2006 | Crew | G06Q 10/06 715/760 |

(Continued)

FOREIGN PATENT DOCUMENTS

| | | | | |
|---|---|---|---|---|
| WO | WO-2012174021 A2 | * | 12/2012 | G06F 9/4443 |
| WO | WO-2015051445 A1 | * | 4/2015 | G06F 17/30253 |
| WO | WO-2022159890 A1 | * | 7/2022 | G06F 8/33 |

OTHER PUBLICATIONS

Communication: "Extended European Search Report", Nov. 15, 2024 (Nov. 15, 2024), European Patent Office, for European Application No. 24182976.1-1203, 13 pages.

*Primary Examiner* — Laurie A Ries
(74) *Attorney, Agent, or Firm* — Buckley, Maschoff & Talwalkar LLC

(57) ABSTRACT

The example embodiments are directed to systems and methods which may provide a guided user interface session for user input to a software process based on annotations added to a process model of the software process. In one example, a method may include receiving runtime data of an instance of software process from a workflow engine that is executing the instance of the software process, determining a process activity that is excepted to happen next within the running instance of the software process, identifying GUI and a subset of input elements within the GUI which are mapped to the determined process activity based on annotations within a process model of the software process, highlighting the identified subset of input elements and disabling any remaining input elements within the GUI to generate a guided GUI, and displaying the guided GUI via a computing system of a user.

17 Claims, 9 Drawing Sheets

(56) References Cited

U.S. PATENT DOCUMENTS

| | | | |
|---|---|---|---|
| 2007/0214218 A1* | 9/2007 | Ward | G06Q 10/06 |
| | | | 709/205 |
| 2009/0006997 A1* | 1/2009 | Jiang | G06Q 10/00 |
| | | | 715/771 |
| 2012/0059842 A1 | 3/2012 | Hille-Doering et al. | |
| 2017/0147190 A1* | 5/2017 | Twist | G06F 3/0481 |
| 2017/0168854 A1* | 6/2017 | Rao | G06F 8/315 |
| 2017/0243018 A1* | 8/2017 | Clagg | G06F 9/44526 |
| 2017/0323350 A1* | 11/2017 | Laderer | G06Q 30/0276 |
| 2018/0203674 A1* | 7/2018 | Dayanandan | G06F 8/35 |
| 2018/0300160 A1* | 10/2018 | Omiya | G06F 3/04817 |
| 2020/0117317 A1* | 4/2020 | Posch | G06F 3/04842 |
| 2022/0103546 A1* | 3/2022 | McFarland | G06F 21/629 |
| 2022/0294992 A1* | 9/2022 | Manzari | H04N 23/633 |
| 2023/0068734 A1* | 3/2023 | Sharda | A63F 13/5375 |
| 2023/0080336 A1* | 3/2023 | Damonte | G06Q 10/06316 |
| | | | 705/7.26 |
| 2024/0248765 A1* | 7/2024 | Scanlan | G06Q 50/16 |
| 2024/0404235 A1* | 12/2024 | Lilaonitkul | G06V 10/25 |

\* cited by examiner

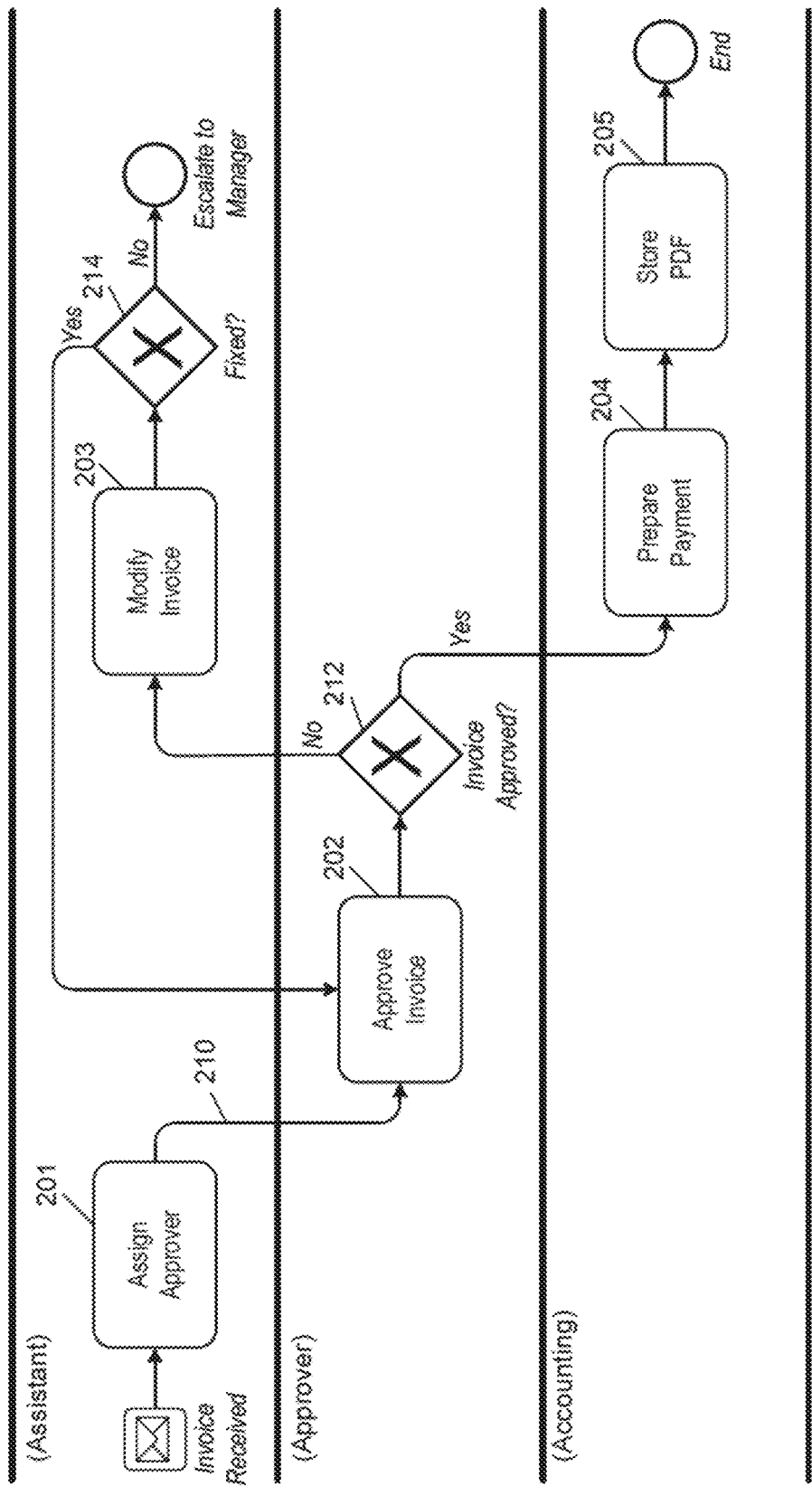

FIG. 2C

| Process Activity 242 | GUI ID 244 | Field ID(s) 246 |
|---|---|---|
| Node 201 | #5 | A1, A3 |
| Node 202 | #5 | B1 |
| Node 203 | #2 | A2, B1, B2, C1, C2 |
| Node 204 | #1 | A1, A2 |
| Node 205 | #7 | C3 |
| | | |

Mapping Table 240

PROCESS EXECUTION GUIDE BASED ON PROCESS MODEL

BACKGROUND

Organizations often rely on enterprise resource planning (ERP) software or the like to run their business processes through software. The software can be used to generate documents such as sales orders, invoices, receipts, shipping orders, and the like, using various software systems. The software can also help organizations create and track orders, generate and clear invoices, receive payments, interact with a website, etc. However, one of the drawbacks with ERP software is that many processes continue to rely on user inputs. In many cases, a user can become stuck or delayed because they are unsure about which commands, fields, inputs, or the like, are needed on the respective user interface. This problem becomes exacerbated when updates are made to the process that the user is expected to follow and/or to the user interface that changes the user interface (e.g., the positioning and labeling of the buttons) in some way. In response, the users of the system must detect which changes affect their duties and learn new procedures for performing duties via the user interface, usually supported by an ever-growing amount of documentation they have to work through to execute the processes as required. For many users, this is a difficult task.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2A is a diagram illustrating a user interface of annotating a process model with user interface elements in accordance with an example embodiment.

FIG. 2C is a diagram illustrating a process of mapping process activities to user interface locations within a mapping table in accordance with an example embodiment.

Figure 1:
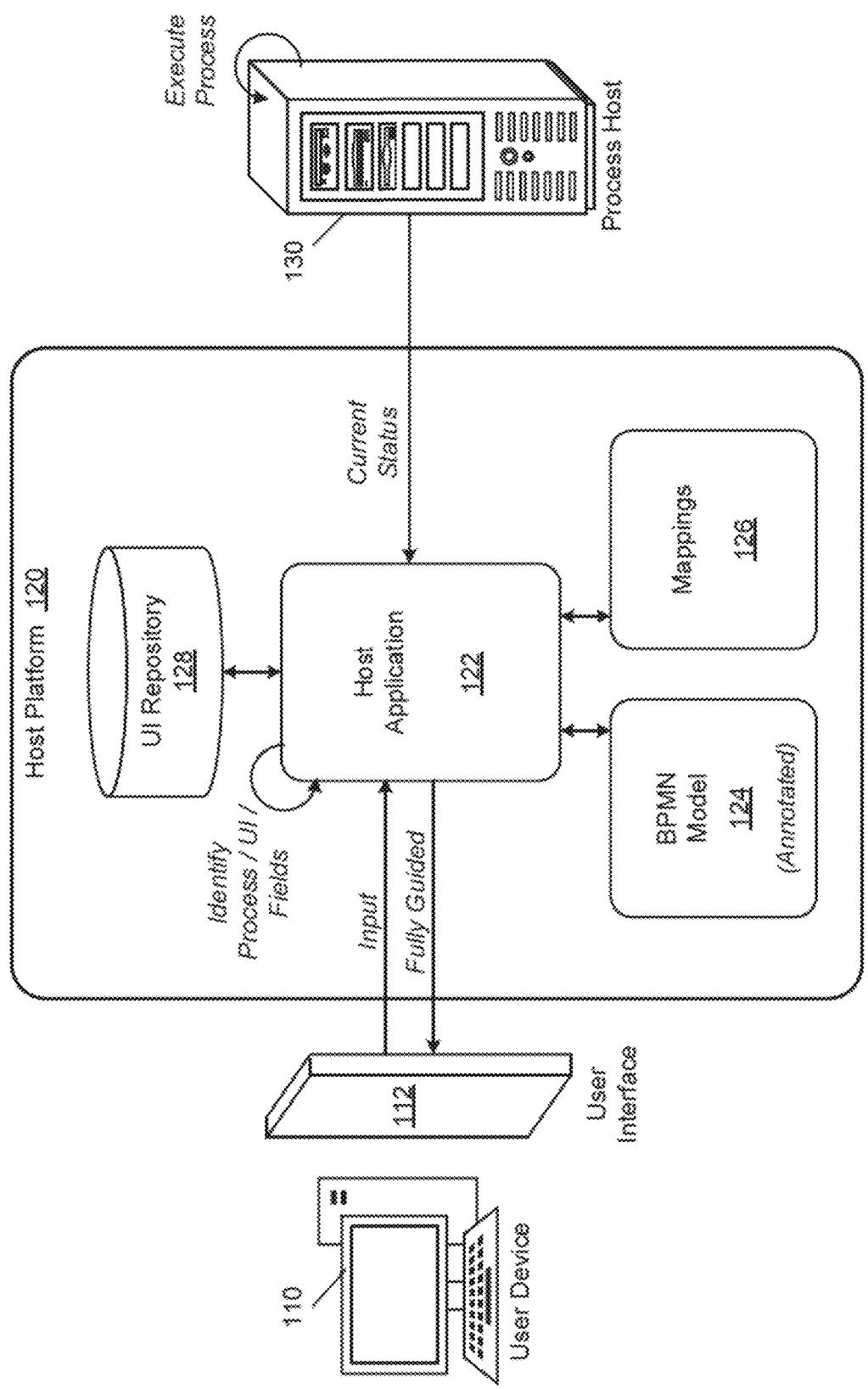
FIG. 1 is a diagram illustrating a host platform for generating a guided process execution in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

Business Process Modeling Notation (BPMN) is a flow-chart technique that represents a business process's phases from beginning to finish. It provides a visual representation of the intricate flow of business operations and information required to complete a process, which is essential to business process management. In layperson terms, the BPMN model is a picture of what the process is supposed to look like. For example, the diagram may include nodes representing activities in the process (e.g., a sale occurs, an invoice is generated, a payment is received, a product is shipped, an invoice is cleared, a delivery is confirmed, etc.) and edges in the diagram that represent an order/dependencies between the activities.

Meanwhile, a workflow engine such as a BPMN engine is capable of interpreting a process model such as a BPMN model and executing a corresponding complex business process represented in the flowchart. For example, the workflow engine may interpret signs, symbols, nodes, edges, directional arrows, etc., within a process model and execute an instance of the process. During execution, the workflow engine can identify and track/monitor a current state of the instance of the process, such as a location within the process/flowchart where the process is currently located. Here, the workflows are typically initiated or resolved by the workflow engine based on pre-set times and deadlines, so that when one task is completed, the workflow engine initiates another human-lead task. The workflow engine can also handle internal network server tasks, the workflow engine can automate these with set, timed cycles. The workflow engine can route a series of tasks, pushing them from one step to the next.

While a BPMN model illustrates a desired flow of how a software-based business process is to be performed, and a workflow engine can carry out that process, there is nothing in the model that enforces the desired flow. As a result, users of the process may cause errors or other delays which result in process failure or other problems. One of the biggest obstacles for a user of such software is when updates are made to the flow of the process (e.g., change an order of tasks, removal or addition of tasks, etc.) or the user interface(s) which affect the input fields and other input mechanisms that are typically accessed by the user. Such user interface changes can cause confusion and delays for data entry. Furthermore, mistakes often occur resulting in delays and even failures. Many users will need a training session or a third party to help them identify the and use the updated user interface.

The example embodiments are directed to a software system (also described herein as a host system) that may generate and output a fully guided approach to data entry for a complex process. The host system may identify a current state of the process, for example, from a workflow engine that is executing/running an instance of the process. The host system may identify annotations within a process model based on the current state of the process to identify a user interface and fields that are needed and output the user interface in a way that "guides" the user to the right enterprise software system and a suitable user interface therein that are stored within a process model of the process.

In some cases, the guided approach may be a "fully" guided approach which prevents a user from the need to learn/understand any of the input elements, fields, names of fields, locations of fields on the user interface, etc. because the user can rely on the software to show them exactly what data needs to be entered and where. Furthermore, when changes are subsequently made to the process or the user interface, the user does not need to familiarize themselves with such changes (e.g., by reading updated manuals, procedures, etc.) Instead, the system can simply update the process model/mappings to map the new process steps to the corresponding input elements/user interface combination thereby guiding the user through experience with the changes without the user even needing to be aware that such changes have taken place.

For example, a business process that involves the sale of goods may include a requirement that a sales order (document) be created which identifies the goods and a requirement that an invoice (document) be generated and cleared. Furthermore, the process may require that a third document (receipt) be sent to the purchaser. Each of these documents may require different systems and different user interfaces. The host system described herein can navigate a user directly to the user interface and the field where the data entry is needed. Furthermore, the system can provide a "guided" approach to the data entry by disabling or otherwise preventing the user from entering data or other inputs into any possible places on the user interface accept the field where the data entry is needed. Here, the system may hide or darken aspects of the user interface which are not accessible and highlight or otherwise visually distinguish the field where the data entry is needed. If a user encounters an exceptional case, a toggle such as a small lock symbol can be displayed in the user interface allowing the user to unlock the rest of the user interface to perform other changes as well if so required. These occurrences are tracked to ensure a feedback loop with the process owner to allow the explicit inclusion of such operating procedures into the next iteration of the business process model.

FIG. 1 illustrates a computing environment 100 for generating and outputting a guided process execution for a complex business process in accordance with an example embodiment. Referring to FIG. 1, a host platform 120 hosts a system (host application 122) that can output the guided process execution on a user interface. For example, the host platform 120 may be a cloud platform, a web server, a database, a combination of devices, and the like. Here, the host application 122 can identify which user interface of the target system needs to be displayed and which fields in the user interface require input based on a current state of the process, and guide the user to input content into the identified fields on the particular user interface. For example, the host application 122 can generate a link, a uniform resource locator (URL), a batch command, or the like, to summon the user interface of the target system. The link may include information that identifies which fields on the user interface are to be highlighted, etc. Once the user has entered the necessary input data, the process progresses to a next step and the user interface is removed from the screen. The fully guided input process may guide a user to input data into specific input elements on the user interface thereby creating a more efficient data entry process.

For example, the host application 122 may identify a current location of the process from a process host 130, such as a workflow engine. The host application 122 may identify a next activity that is to be performed based on a node, an edge, or other part of a process model 124 that corresponds to the current location of the process. Here, the host application 122 may identify/read annotations that have been embedded or otherwise incorporated into a graphic representation of the next activity within the process model 124 and identify a mapping 126 for the next activity. The host application 122 may map the activity to a user interface stored in a user interface (UI) repository 128 based on the mapping 126. In addition, the host application 122 may map the activity to a subset of user interface input elements on the user interface such as fields, buttons, menus, radios, etc.

Next, the host application 122 may generate a notification and send it to a user device 110 of the user who is responsible for the next activity to be performed. The user's information may be maintained within the process model 124 as part of the roles (i.e. swim lanes in BPMN) assigning responsibility for specific tasks to roles such as "Accountant") or within other logic within the host application 122. As an example, the notification may be delivered to an "inbox" of the user such as an email inbox, a process activity inbox, or the like. When the user clicks on the notification, the host platform may summon a particular user interface for the notification and output the fully-guided user interface experience to the user device 110 via the particular user interface. Here, the host application 122 may navigation a view of a user interface 112 on the user device 110 to the subset of fields on the user interface where the data entry is required while preventing the user device 110 from entering data or other inputs into other areas of the user interface such as other areas that include input fields that are not associated with the next activity.

The UI repository 128 may store a repository of user interfaces (e.g., screens, pages, etc.) from software applications that are used by the complex business process. The user interfaces may be uniquely identifiable and retrievable from the UI repository 128. The host application 122 may identify which UI is to be retrieved from the UI repository 128 based on annotations within the process model 124. For example, the annotations may be within a node that corresponds to the next activity in the process model. In this case, the node may include annotations stored therein (e.g., within metadata of the model, etc.) which can be read by the host application 122 and used to identify the user interface and the subset of input elements based on the mapping 126. Furthermore, the host application 122 may navigate a view of the user interface 112 directly to the identified user interface with only the subset of input fields available for access and input.

FIG. 2A illustrates a user interface 200 for annotating a process model with user interface elements in accordance with an example embodiment. Referring to FIG. 2A, the user interface 200 includes a display of a process model such as a BPMN model. In this example, the process model includes a plurality of swim lanes corresponding to a plurality of participants (e.g., user roles) of the process, along with activities that are to be performed by each of the different respective roles displayed within the swim lanes. In this example, the three roles/swim lanes correspond to an "assistant" that receives an invoice via electronic means such as email, an "approver" that reviews the invoice and determines whether or not approve the invoice for payment, and a "manager" that revies the approval.

The process shown in FIG. 2A includes five activities that are represented by five nodes in the diagram including a node 201 corresponding to a first activity, a node 202 corresponding to a second activity, a node 203 corresponding to a third activity, a node 204 corresponding to a fourth activity, and a node 205 corresponding to a fifth activity. The process also includes directional edges 210 between the nodes that establish a flow and dependencies between the nodes 201, 202, 203, 204, and 205 of the process. The activities may involve different user interfaces, documents, data systems on the backend, and the like. The process also includes decisions 212 and 214 that control the path of the process during execution.

According to various embodiments, the user interface 200 enables a user to use an input mechanism such as a mouse, a keyboard, voice activation, etc. to add annotations, metadata, data values, etc. into the diagram of the process model. In doing so, the user can generate a mapping between user interfaces and activities, as well as user interface input elements from the user interface to the activities. The annotations can be read by the host application here to identify mappings between activities within the process model and user interface elements that are necessary for inputting data into those activities of the process. In some cases, the annotations may include the mappings in the process model. As another example, the mappings may be stored in a separate file created by the host application.

Figure 2B:
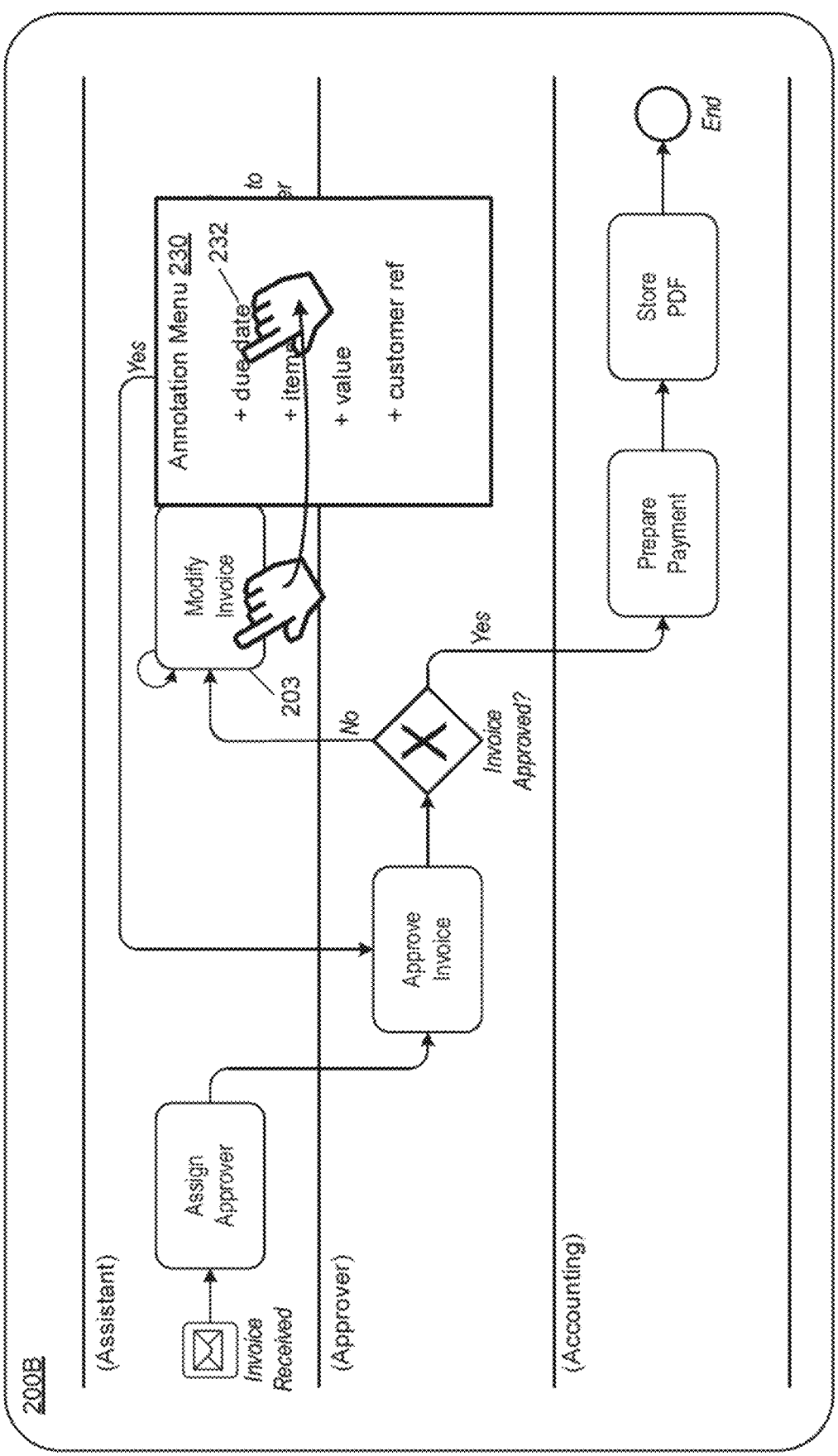
FIG. 2B is a diagram illustrating a mapping that is generated by the annotating process in FIG. 2A, in accordance with an example embodiment.

For example, FIG. 2B illustrates a process 220 of a user moving a cursor over the node 203 corresponding to an invoice modification activity within the process model and selecting it (e.g., clicking on it) with a pointer mechanism such as a mouse or a finger. Here, the selection of the node 203 corresponding to the third activity (modify invoice) causes the user interface 200B to display a menu 230 for adding annotations (e.g., mappings, etc.) into the process model. The menu may include user interface input elements (e.g., target enterprise software system, affected business document, field names, input button names, etc.) which allow the user to add or remove such input elements to the activity within the process model. By doing so, the user can annotate the process model. The annotations can be detected by the host system and used by the system to create a mapping (such as shown in a mapping table 240 in FIG. 2C) between a particular activity within the process, a user interface identifier of a user interface of the target system, and user interface fields/input elements identifiers on the user interface. The mapping shown in the FIG. 2C is just for purposes of example and is not meant to limit the example embodiments. The annotations within the process model may identify additional attributes that can be stored in the mapping in the mapping table including, but not limited to, an identifier of the target system, business documents, data model attributes, user interface options, and the like.

For example, the user may use the cursor to select a field 232 from a user interface associated with modifying an invoice that is associated with that activity. In response, the system may add an entry to the mapping table 240 that creates a mapping between the field 232 on the user interface and the activity corresponding to the node 203 in the process model.

When live execution of an instance of the process subsequently occurs, the host system may identify a current state of the process instance to identify a next activity to be performed. In this example, the system may identify that the activity corresponding to node 203 in the process model is next. As such, the system can identify the user interface/user interface fields that are needed for inputting data associated with that activity from the mapping table 240, and generate a guided user interface experience of the user. For example, the user's browser, application, etc., may be navigated directly to the user interface and corresponding business document instance associated with the process instance that needs input, and the field that needs the input.

The process model may be updated anytime throughout the life of the process. For example, the process model may be updated to remove annotations, activities, paths, steps, etc., from the process model. When this occurs, the mapping may also change. For example, the system may remove entries from the mapping in response to the user removing a field from the process model.

Referring to FIG. 2C, the mapping table 240 includes three columns 242, 244, and 246 corresponding to three attributes associated with the process including an activity identifier that identifies an activity within the process (i.e., a node), a user interface identifier that identifies a user interface that is needed for inputting data into that activity, and a UI input element identifier that identifies a user interface input element or elements for inputting the data for that activity, respectively. The mapping table 240 can be read by the host system to identify which fields on which user interface are to be displayed for each activity in the process. Each user interface stored in the repository may have a different identifier associated therewith that is stored in a directory that maps to a storage location of the user interface in the repository. Accordingly, the host application can use a user interface identifier that is annotated within a process model to retrieve a user interface from the repository based on the directory.

Figure 3:
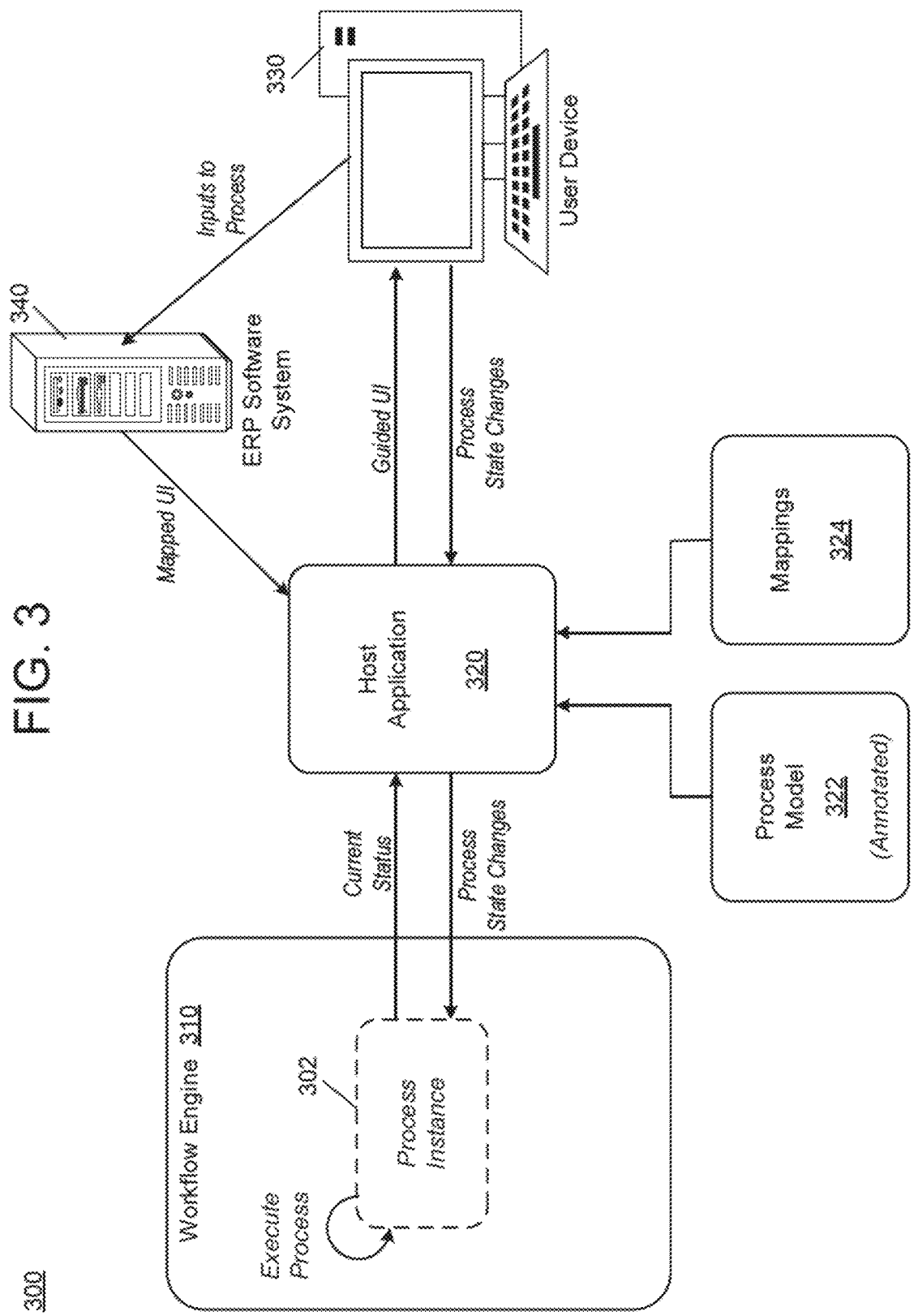
FIG. 3 is a diagram illustrating a process of determining a next action of a process based on a current status of the process in accordance with an example embodiment.

FIG. 3 illustrates a process 300 of determining a next action of a process via a host application 320 based on a current status of the process provided by a workflow engine 310 in accordance with an example embodiment. Referring to FIG. 3, an instance 302 of the process may be executed by a workflow engine 310. For example, the workflow engine 310 may analyze a process model (e.g., BPMN model, etc.) of the process and interpret the content of the BPMN model to execute the process. The workflow engine 310 may create workflows for resolving tasks that are open ended and uncompleted within the instance of the process based on a current state of the process.

For example, the workflow engine 310 may run on both time-based and business-rules engines, meaning that rules can include a set of logical conditions or may be initiated by a set time or deadline. Furthermore, multiple users may concurrently execute a part of a task that is relevant to their role via the workflow engine 310. Once a part of the cycle is complete, the workflow engine 310 can trigger differentiated notifications segmented for the customer, sales executive and administrator. Here, the workflow engine 310 may enable version control, and may perform user-authentication to control access, state-persistency, which frees up memory for longer-term processes, such as contract management, and the like.

According to various embodiments, the workflow engine 310 may track a current location of the instance 302 of the process based on the status of the workflows being executed. For example, if the workflow engine 310 detects a first activity is completed, it may notify the host application 320. As another example, if the workflow engine 310 detects that the first activity is completed, it may notify the host application 320 of a next activity to be performed. Thus, the host application 320 can identify a current state of the instance 302 of the process. Here, the host application 320 can consult one or more of an annotated process model 322 and a mapping 324 to identify a user interface, and user input elements from the user interface that are associated with the next activity. Furthermore, the host application 320 can generate a user interface/dashboard that includes the user interface along with a guided approach for entering data into the identified user input elements from the user interface. Here, the guided approach may be output on the user interface to a user device 330 of the user. As an example, the process can be performed based on process mining like analysis capabilities on one or more target systems such as ERP software system 340. Here, the ERP software system 340 may receive inputs to the process from the user device 330 and annotate the process model and/or perform mappings that are stored in the mapping table such as shown in FIG. 2C. As another example, the process may be performed in response to a hook on the user interface which informs the workflow engine 310 and the host application 320 about successful state changes to the process instance 302 based on the user's actions.

Figure 4A:
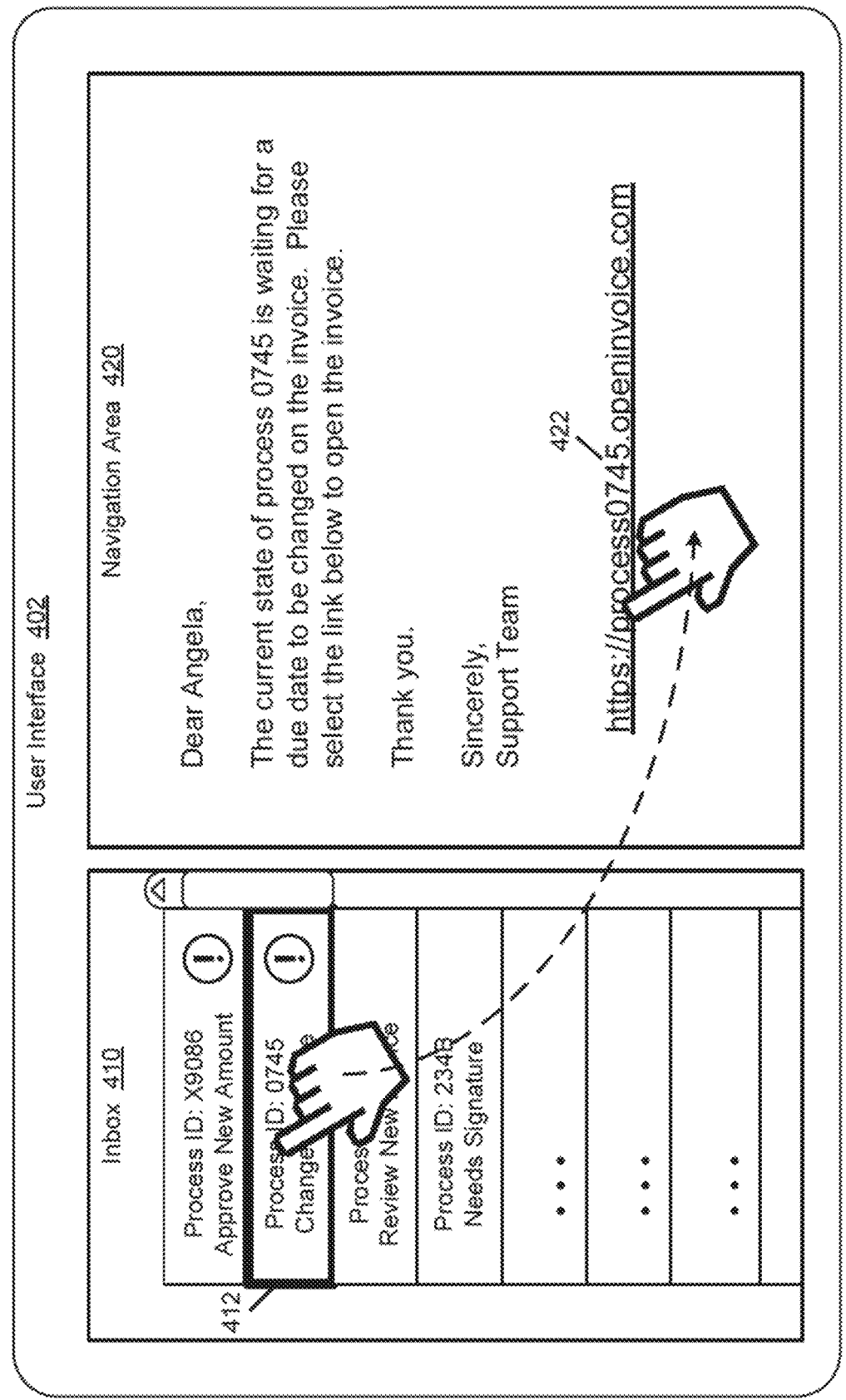
FIG. 4A is a diagram illustrating an inbox view of matters requiring attention in accordance with an example embodiment.

FIG. 4A illustrates a process 400A of a user viewing an inbox for matters requiring attention in accordance with an example embodiment. Referring to FIG. 4A, a user interface 402 may be displayed on a user device, such as the user device 330 shown in FIG. 3. Here, the user may view tasks, emails, messages, etc. For example, an inbox 410 on the user interface may include a condensed summary of each waiting matter/task within the inbox. Thus, a user can see a summary of the matter that is waiting for their attention. This inbox may also be shared among multiple users sharing the same role to ensure continuity if someone is on vacation. In some embodiments, the host application 320 described herein may generate alerts that are included in the summarized/condensed view in the inbox 410. Furthermore, the host application 320 may re-arrange the matters in the inbox 410 such that the more urgent matters are placed on top of the inbox 410.

In the example of FIG. 4A, the user has selected a matter 412 from the inbox 410. In response, a message corresponding to the matter 412 is opened within a navigation area 420 of the user interface 402. The navigation area 420 includes a message which explains that urgent matter awaiting the user's attention, and a link 422 to a guided UI experience. A link is not necessary, however. For example, simply clicking on the matter 412 may navigate the user directly to a guided UI experience without opening the message within the navigation area 420. When the user clicks on the link 422, the guided approach is generated by the host application 320. For example, the user interface 402 may be replaced on the user device 330 with a user interface shown in FIG. 4B.

Figure 4B:
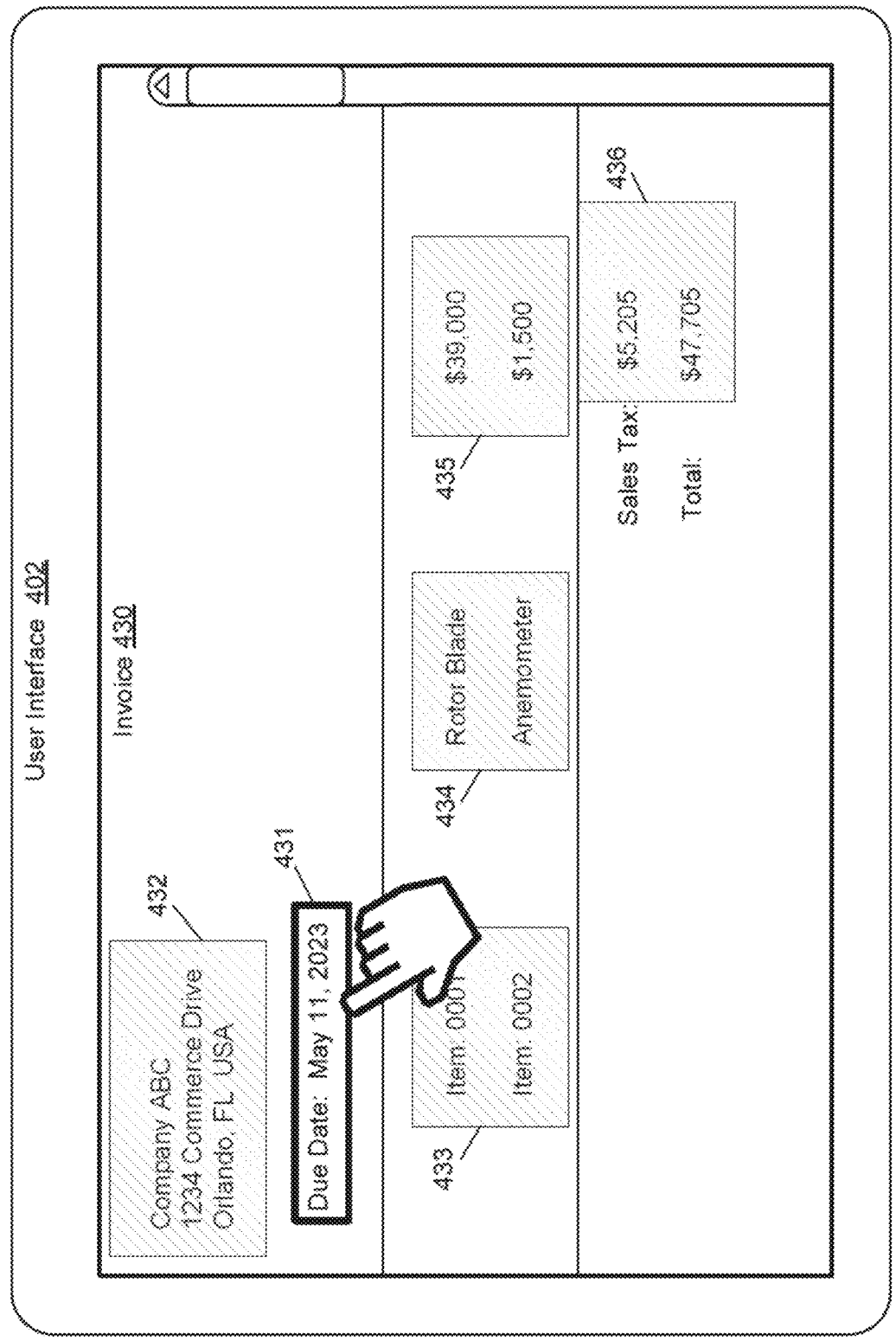
FIG. 4B is a diagram illustrating a user interface with a fully guided approach in accordance with an example embodiment.

FIG. 4B illustrates a process 400B of providing a guided approach via the user interface 402 in accordance with an example embodiment. As an example, the guided approach may be referred to as a "fully guided approach". In this example, the host system may guide the user to the specific field or fields where data entry is required by the user, and disable or otherwise prevent the user from entering data into other fields or areas of the user interface and the application. Referring to FIG. 4B, in response to the user clicking on the link 422 in the navigation area 420 of the message, the host system may navigate the user interface 402 to a fully-guided experience for the user.

For example, the host system may navigate to a view of an invoice 430 that corresponds to the matter 412. The host system may highlight, bold, underline, color, mark, etc. a field 431 where data input is required and disable other fields and values on the user interface including the fields and values within content areas 432, 433, 434, 435, and 436. To disable the content area 432, 433, 434, 435, and 436, the host system may overlay dark or shaded content on top of thereof. As another example, the host system may remove the items from the user interface leaving only the input elements that require input. By navigating to the user interface, the system provides a "guided approach" to data entry. Furthermore, by highlighting the needed input element and disabling non-necessary input elements, the system can provide a "fully guided approach" to data entry.

The fully guided approach prevents a user from entering data into areas of the user interface and the application that are not needed. Moreover, it prevents the user from needing to learn/understand any of the input elements, fields, names of fields, locations of fields on the user interface, etc. because the user can rely on the software to show them exactly what data needs to be entered.

Figure 5:
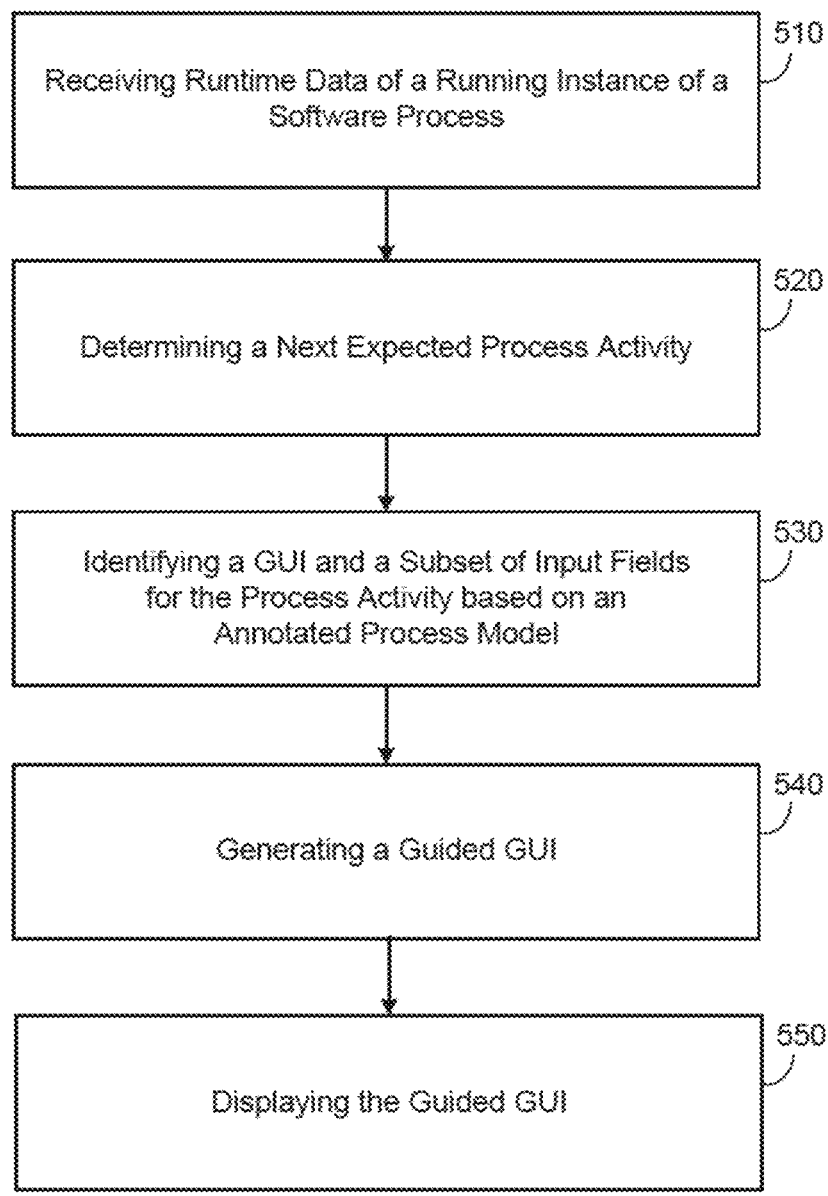
FIG. 5 is a diagram illustrating a method of generating and outputting a guided process execution in accordance with an example embodiment.

FIG. 5 illustrates a method 500 a method of generating and outputting a guided process execution in accordance with an example embodiment. For example, the method 500 may be performed by a software application hosted by a host platform such as a cloud platform, a web server, a distributed system, a database, or the like. Referring to FIG. 5, in 510, the method may include receiving runtime data of an instance of software process from a workflow engine that is executing the instance of the software process. For example, the runtime data may include runtime data such as current steps executed, next steps to be executed, and the like. In some embodiments, the workflow engine may provide an identifier of the next step to be executed to the host system described herein.

In 520, the method may include determining a process activity that is expected to happen next within the running instance of the software process based on the runtime data. In 530, the method may include identifying a graphical user interface (GUI) and a subset of input elements within the GUI which are mapped to the determined process activity based on annotations within a process model of the software process. In 540, the method may include highlighting the identified subset of input elements and disabling any remaining input elements within the GUI to generate a guided GUI. In 550, the method may include displaying the guided GUI via a computing system of a user.

In some embodiments, the highlighting may include rendering a highlighted line around each input field among the subset of input fields, and the disabling comprises overlaying a darkened mask on the disabled remaining input elements within the guided GUI. In some embodiments, the method may further include displaying a diagram of the process model via a user interface, and generating the annotations within the process model of the software process based on inputs received via the displayed diagram of the process model on the user interface. In some embodiments, the identifying may include identifying the subset of input elements based on a mapping table of the process model that includes a mapping between the process activity, the GUI, and the subset of input elements.

In some embodiments, the method may further include receiving an input which removes an activity from the process model, and in response, removing a mapping between the removed activity and one or more input elements from the mapping table of the process model. In some embodiments, the receiving may include receiving updates of a status of the process instance from the workflow engine as the workflow engine executes the process instance in parallel. In some embodiments, the method may further include generating a notification for the user in response to the determination that the process activity is expected to happen next, and transmitting the notification to an inbox of the user. In some embodiments, the method may further include displaying the fully-guided GUI in response to detecting a selection of the notification within the inbox of the user.

Figure 6:
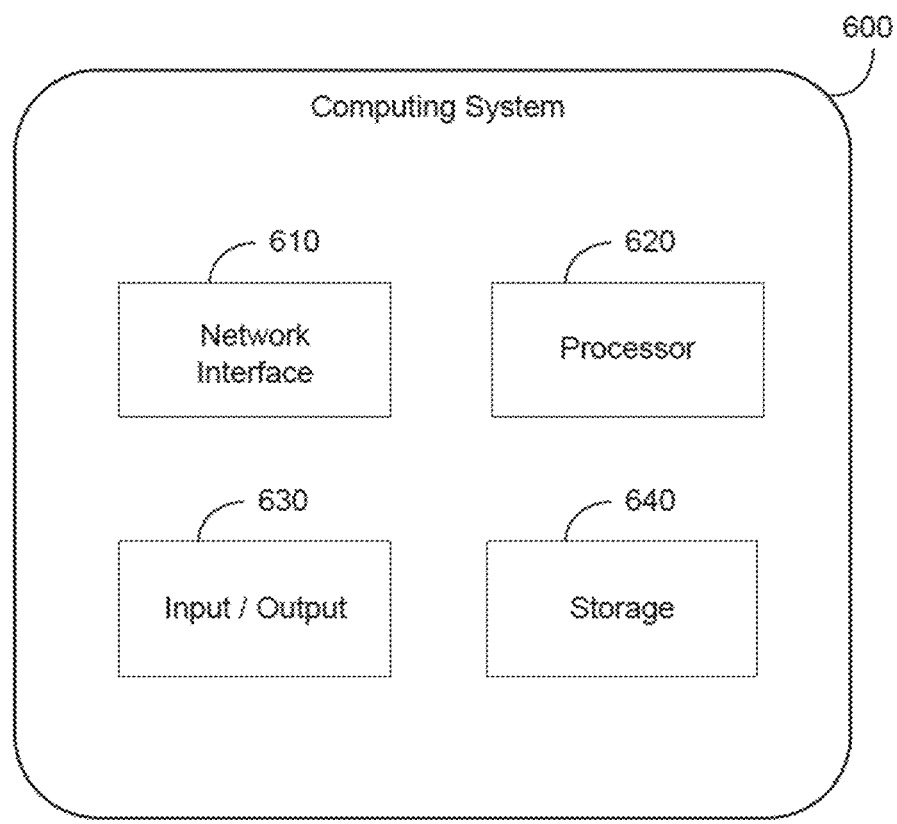
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the methods described herein. According to various embodiments, the storage 640 may include a data store having a plurality of tables, records, partitions and sub-partitions. The storage 640 may be used to store database records, documents, entries, and the like.

According to various embodiments, the storage 640 may be configured to store a process model of a software process. As just an example, the process model may be a BPMN model or the like which includes a flowchart diagram of the steps/activities performed during the process and a sequence/order to the activities including dependencies. The processor 620 may receive runtime data of an instance of the software process from a host of the process such as a workflow engine that executes the instance of the software process, and in response, determine a process activity that is expected to happen next within the instance of the software process based on the runtime data. For example, the workflow engine may identify which part of the process the current instance of the process is at.

The processor 620 may also identify a GUI based and a subset of input elements within the GUI which are mapped to the determined process activity based on annotations within the process model of the software process. The processor 620 may highlight the identified subset of input elements and disable any remaining input elements within the GUI to generate a guided GUI, and display the guided GUI via a computing system of a user.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory medium.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a storage configured to store a process model of a software process; and
a processor configured to:
receive runtime data of an instance of the software process from a workflow engine that executes the instance of the software process;
determine a process activity that is expected to happen next within the instance of the software process based on the runtime data;
identify a graphical user interface (GUI) and a subset of input elements within the GUI which are mapped to the determined process activity based on annotations within the process model of the software process stored in the storage;
highlight the identified subset of input elements and disable any remaining input elements within the GUI to generate a guided GUI;
display the guided GUI via a computing system of a user;
display a diagram of the process model via a user interface; and
generate the annotations within the process model of the software process based on inputs received via the displayed diagram of the process model on the user interface.

2. The computing system of claim 1, wherein the processor is configured to render a highlighted line around each input field among the subset of input fields, and overlay a darkened mask on the disabled remaining input elements within the guided GUI.

3. The computing system of claim 1, wherein the processor is configured to identify the subset of input elements based on a mapping table of the process model that includes a mapping between the process activity, the GUI, and the subset of input elements.

4. The computing system of claim 3, wherein the processor is configured to receive an input which removes an activity from the process model, and in response, remove a mapping between the removed activity and one or more input elements from the mapping table of the process model.

5. The computing system of claim 1, wherein the processor is configured to generate a notification for the user in response to the determination that the process activity is expected to happen next, and transmit the notification to an inbox of the user.

6. The computing system of claim 5, wherein the processor is configured to display the fully-guided GUI in response to detecting a selection of the notification within the inbox of the user.

7. A computing system comprising:
a storage configured to store a process model of a software process; and
a processor configured to:
receive runtime data of an instance of the software process from a workflow engine that executes the instance of the software process;
determine a process activity that is expected to happen next within the instance of the software process based on the runtime data;
identify a graphical user interface (GUI) and a subset of input elements within the GUI which are mapped to the determined process activity based on annotations within the process model of the software process stored in the storage;
highlight the identified subset of input elements and disable any remaining input elements within the GUI to generate a guided GUI; and
display the guided GUI via a computing system of a user;
wherein the processor is configured to receive updates of a status of the process instance from the workflow engine as the workflow engine executes the process instance in parallel.

8. A method comprising:
receiving runtime data of an instance of software process from a workflow engine that is executing the instance of the software process;
determining a process activity that is expected to happen next within the running instance of the software process based on the runtime data;
identifying a graphical user interface (GUI) and a subset of input elements within the GUI which are mapped to the determined process activity based on annotations within a process model of the software process;
highlighting the identified subset of input elements and disabling any remaining input elements within the GUI to generate a guided GUI;
displaying the guided GUI via a computing system of a user;
displaying a diagram of the process model via a user interface; and
generating the annotations within the process model of the software process based on inputs received via the displayed diagram of the process model on the user interface.

9. The method of claim 8, wherein the highlighting comprises rendering a highlighted line around each input field among the subset of input fields, and the disabling comprises overlaying a darkened mask on the disabled remaining input elements within the guided GUI.

10. The method of claim 8, wherein the identifying comprises identifying the subset of input elements based on a mapping table of the process model that includes a mapping between the process activity, the GUI, and the subset of input elements.

11. The method of claim 10, wherein the method further comprises receiving an input which removes an activity from the process model, and in response, removing a mapping between the removed activity and one or more input elements from the mapping table of the process model.

12. The method of claim 8, wherein the method further comprises generating a notification for the user in response to the determination that the process activity is expected to happen next, and transmitting the notification to an inbox of the user.

13. The method of claim 12, wherein the method comprises displaying the fully-guided GUI in response to detecting a selection of the notification within the inbox of the user.

14. A method comprising:
receiving runtime data of an instance of software process from a workflow engine that is executing the instance of the software process, wherein the receiving comprises receiving updates of a status of the process instance from the workflow engine as the workflow engine executes the process instance in parallel;
determining a process activity that is expected to happen next within the running instance of the software process based on the runtime data;
identifying a graphical user interface (GUI) and a subset of input elements within the GUI which are mapped to the determined process activity based on annotations within a process model of the software process;

highlighting the identified subset of input elements and disabling any remaining input elements within the GUI to generate a guided GUI;

displaying the guided GUI via a computing system of a user.

15. A computer-readable medium comprising instructions which when executed by a processor cause a computer to perform a method comprising:

receiving runtime data of an instance of software process from a workflow engine that is executing the instance of the software process;

determining a process activity that is expected to happen next within the running instance of the software process based on the runtime data;

identifying a graphical user interface (GUI) and a subset of input elements within the GUI which are mapped to the determined process activity based on annotations within a process model of the software process;

highlighting the identified subset of input elements and disabling any remaining input elements within the GUI to generate a guided GUI;

displaying the guided GUI via a computing system of a user;

displaying a diagram of the process model via a user interface; and generating the annotations within the process model of the software process based on inputs received via the displayed diagram of the process model on the user interface.

16. The computer-readable medium of claim 15, wherein the highlighting comprises rendering a highlighted line around each input field among the subset of input fields, and the disabling comprises overlaying a darkened mask on the disabled remaining input elements within the guided GUI.

17. The computer-readable medium of claim 15, wherein the identifying comprises identifying the subset of input elements based on a mapping table of the process model that includes a mapping between the process activity, the GUI, and the subset of input elements.

* * * * *